United States Patent [19]
Otto et al.

[11] Patent Number: 5,614,911
[45] Date of Patent: Mar. 25, 1997

[54] RADAR-BASED METHOD OF LEVEL MEASUREMENT

[75] Inventors: Johanngeorg Otto, Aalen-Hofherrnweiler; Stefan Burger, Freiburg; Peter Gerst, Karlsruhe, all of Germany

[73] Assignee: Endress + Hauser GmbH + Co., Maulburg, Germany

[21] Appl. No.: 436,391

[22] PCT Filed: Sep. 20, 1994

[86] PCT No.: PCT/EP94/03136

§ 371 Date: May 18, 1995

§ 102(e) Date: May 18, 1995

[87] PCT Pub. No.: WO95/08780

PCT Pub. Date: Mar. 30, 1995

[30] Foreign Application Priority Data

Sep. 21, 1993 [DE] Germany .......................... 43 32 071.6

[51] Int. Cl.⁶ ................................................. G01S 13/08
[52] U.S. Cl. ................................................... 342/124
[58] Field of Search .......................................... 342/124

[56] References Cited

U.S. PATENT DOCUMENTS

| | | | |
|---|---|---|---|
| 4,234,882 | 11/1980 | Thompson | 342/124 |
| 4,443,792 | 4/1984 | Pidgeon et al. | 340/612 |
| 4,561,064 | 12/1985 | Brüggen et al. | 364/561 |
| 4,972,386 | 11/1990 | Lau | 367/99 |
| 5,321,408 | 6/1994 | Jean et al. | 342/124 |
| 5,323,361 | 6/1994 | Elle et al. | 367/98 |
| 5,365,178 | 11/1994 | Van Der Pool | 324/644 |
| 5,406,842 | 4/1985 | Locke | 342/124 X |
| 5,440,310 | 8/1995 | Schreiner | 342/124 |

FOREIGN PATENT DOCUMENTS

| | | |
|---|---|---|
| 2938969C2 | 4/1981 | Germany . |
| 3207950A1 | 3/1982 | Germany . |
| 3134243A1 | 7/1982 | Germany . |
| 4218303C1 | 3/1994 | Germany . |

*Primary Examiner*—John B. Sotomayor
*Attorney, Agent, or Firm*—Bose McKinney & Evans

[57] ABSTRACT

In a method of level measurement on a radar basis, microwaves are emitted by means of an antenna to the surface of a material in a container and the echo waves reflected from the surface thereof are received. An actual echo function representing the echo amplitudes as a function of the distance is formed from the echo waves received by the antenna for each measurement, the probable useful echo and the transit time thereof are established from the actual echo function, and the distance of the material surface from the antenna is determined therefrom. To recognize the formation of a deposit and/or other trouble, such as e.g. damage to or loss of the antenna, an undisturbed echo function corresponding to an undisturbed measurement is obtained and stored prior to performing the measurements. In each measurement the actual echo function is compared to the stored undisturbed echo function. When due to the comparison, deviations between the two functions are found in the antenna region and the proximity zone, these deviations are evaluated to recognize the formation of a material deposit and/or other trouble.

10 Claims, 10 Drawing Sheets

RADAR-BASED METHOD OF LEVEL MEASUREMENT

BACKGROUND OF THE INVENTION

1. Field of the Invention

This invention relates to a method of level measurement on a radar basis in which, by means of an antenna, microwaves are emitted to the surface of a material in a container and the echo waves reflected from the surface thereof are received, an actual echo function representing the echo amplitudes as a function of the distance is formed from the echo waves received by the antenna for each measurement, the probable useful echo and the transit time thereof is established from the actual echo function, and the distance of the material surface from the antenna is determined therefrom.

2. Description of the Prior Art

For radar-based level measurement all known methods may be employed which permit relatively short distances to be measured by means of reflected microwaves, the best-known examples of which are pulsed radar and frequency modulated continuous wave radar (FMCW radar). In pulsed radar short microwave transmission pulses are emitted periodically which are reflected by the object being measured and re-received as an echo signal after a transit time depending on the distance involved. The received signal amplitude versus time function constitutes the echo function. Every value of this echo function corresponds to the amplitude of an echo due to reflection at a certain distance from the antenna. In FMCW radar a continuous microwave is emitted which is periodically linearly frequency-modulated, for example, according to a saw-tooth function. The frequency of each received echo signal thus exhibits with respect to the instantaneous frequency which the transmission signal has at the time of reception, a difference in frequency which depends on the transit time of the echo signal. The difference between the frequency of the transmission signal and that of the reception signal which may be obtained by mixing both signals and evaluating the Fourier spectrum of the mixed signal, thus corresponds to the distance of the reflecting surface of the object away from the antenna, and the level of the frequency characteristic corresponds to the magnitude of the echo amplitude. This Fourier spectrum, therefore, constitutes the echo function in this case. In prior art the entirety of the echo function obtained in the course of a measurement cycle is stored and then the stored echo function is evaluated according to a given program by a computer to establish the useful echo and to determine the transit time of the useful echo. Storing the echo function in this case is preferably done in digitized form by the echo function being periodically sampled, each sampled value being converted by an analog-to-digital converter into a digital code group and the digital code groups being written into a RAM of the computer.

A particular problem in connection with level measurement using microwaves is that a deposit of material may build up on the antenna. This danger is more particularly to be found in the case of dusty or powdery material, especially if the antenna is moist, and furthermore in the case of sticky, viscous, spattering or stirred materials. While microwave antennas tolerate a certain degree of fouling, they cease to be operational if the deposit layer is excessive. In this case the radar signal will be completely absorbed at the antenna so that no useful echo may be detected. Using conventional methods it is accordingly no longer possible to distinguish whether there is no reflecting surface present in the beam path, whether there is heavy attenuation in the beam path clear of the antenna (for instance in the case of foam on the material), whether the antenna has been blocked by the formation of a deposit or whether material is located in the immediate vicinity of the antenna.

The object of the invention is to provide a method of the aforementioned kind which permits the recognition of the formation of deposits on the antenna and of other trouble such as, for instance, damage to or loss of the antenna and by means of which a distinction is permitted between a deposit on the antenna and material in the immediate vicinity of the antenna.

SUMMARY OF THE INVENTION

This object is achieved according to the invention in that each actual echo function is compared to a stored undisturbed echo function corresponding to an undisturbed measurement and deviations detected in the antenna region and in the adjacent proximity zone are evaluated to recognize the formation of a deposit and/or other trouble.

The invention is based on the knowledge that the echo function section originating from reflections in the antenna region and the proximity zone changes characteristically when the antenna is soiled by a deposit of material. Such reflection may more particularly originate from the antenna itself, should it take the form of a horn antenna, for example. While there is a general tendency to achieve optimum antenna matching to avoid discontinuities in impedance so that there is no troublesome local reflection, which would swamp the useful signal, there is in practice nevertheless internal reflection, as for example with a horn feeder, at the point where feed into the antenna takes place. Furthermore, reflection results in the vicinity of the antenna due to multiple internal reflection in the region of the conductors connecting the HF module, feeders and antenna. In the method according to the invention use is made of these reflections from the antenna region and the proximity zone to recognize trouble.

For this purpose an undisturbed echo function is obtained as a reference function and stored in a non-volatile memory before the measurement arrangement is put into first-time operation. This undisturbed echo function covers at least the echo profile in the antenna region and the proximity zone, but also preferably the echo profile up to the end of the measurement range to reliably determine the useful echo. Obtaining and storing the undisturbed echo function is done in the same way and by the same means as for obtaining and storing the actual echo functions in the course of the measurement, but on the condition that the measurement is undisturbed. The measuring arrangement including the antenna must thus be undamaged and function satisfactorily, the antenna must not be soiled by a material deposit and no material must be present in the vicinity of the antenna. Preferably, obtaining the undisturbed echo function is done with the container empty. Obtaining the undisturbed echo function may be repeated when required, for instance when there has been a change in the measurement conditions, here too, however, it being necessary that the aforementioned conditions for an undisturbed measurement are satisfied.

In operation every actual echo function obtained in the antenna region and the proximity zone during the level measurement is compared to the stored undisturbed echo function and any differences are analyzed and evaluated to recognize the formation of deposits or other trouble. For this purpose it is of advantage to also form and consider the difference function between the two echo functions in the antenna region and its vicinity.

BRIEF DESCRIPTION OF THE DRAWINGS

Advantageous embodiments and further developments of the invention are characterized in the sub-claims.

Further features and advantages of the invention will be appreciated from the following descriptive disclosure when considered in conjunction with the accompanying drawings in which.

DETAILED DESCRIPTION

Figure 1:
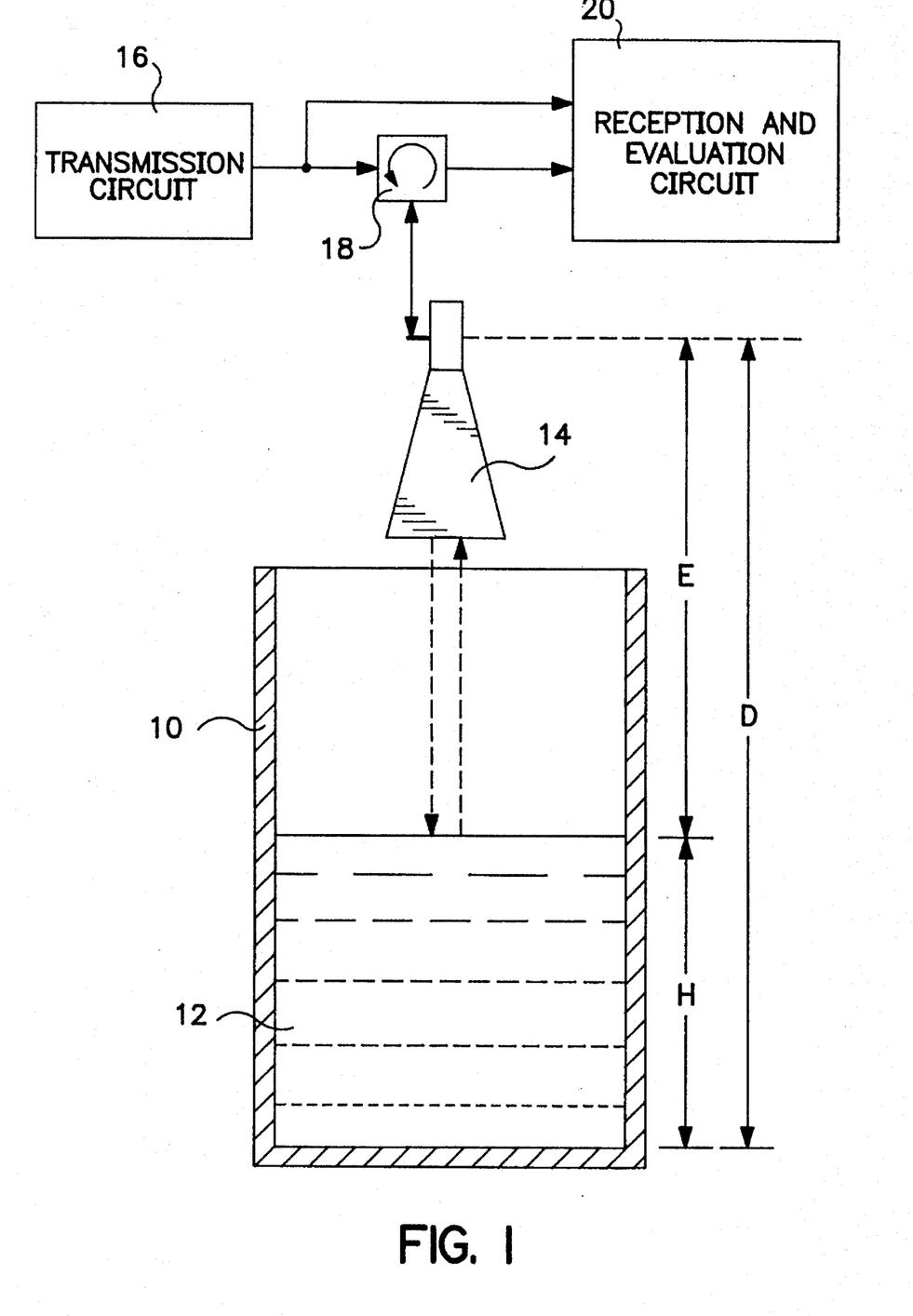
FIG. 1 depicts the basic principle of a level measuring device operating with microwaves.

FIG. 1 in the the drawings shows a container 10, which is filled up to a height or level H with a material 12. For measuring the level H an antenna 14 is mounted above the container 10, which transmits an electromagnetic wave toward the surface of the material 12 in the container and which can receive the echo wave due to reflection at the surface. The transmitted electromagnetic wave is produced by a transmission circuit 16, which is connected via a transmit-receive switch 18 to the antenna 14. The echo wave received by the antenna 14 is supplied via the transmit-receive switch 18 to a reception and evaluation circuit 20, which on the basis of the transmitted signal supplied by the transmission circuit 16 to the antenna 14 and the received signal supplied by the antenna 14 determines the distance E between the antenna 14 and the surface of the material 12. Since the distance D of the antenna 14 from the bottom of the container 10 is known, the difference between this distance D and the measured distance E produces the wanted material level H.

Since the distances to be measured are extremely small in comparison with the propagation rate of the electromagnetic waves, very short waves need to be used to attain sufficient accuracy of measurement, which are in the microwave range. The antenna 14 is naturally designed for transmitting and receiving such short waves: it being equipped, for example, with a horn radiator as is indicated in FIG. 1.

For the measurement of the distance E any known radar method may be employed. All such methods are based on the principle that the transit time of the electromagnetic waves from the antenna to the reflecting surface and back to the antenna again is measured. Since the propagation rate of the electromagnetic waves is known it is possible to compute the path travelled from the transit time measured. Since besides the useful echo, which results from reflection at the surface to be detected, interfering echos may occur as well, it is conventional for the entire received signal to be converted into an echo function which represents the intensity distribution of the received signals as a function of the distance. From this echo function the useful echo is determined and the transit time thereof ascertained.

One known radar method is pulsed radar, in the case of which short pulses are periodically transmitted and in a reception phase following each transmission of a pulse the echo signals at the frequency of the transmitted pulse are detected. In this case the signal amplitude received in the course of each reception phase against time will directly constitute the echo function. Each value of this echo function corresponds to the amplitude of an echo due to reflection at a certain distance from the antenna. The position of the useful echo in the echo function will therefore directly indicate the distance to be measured.

Direct transit time measurement is avoided in the frequency modulated continuous wave method (FMCW method). In this method a continuous microwave is transmitted, which is periodically linearly frequency modulated, for example in accordance with a saw-tooth function. The frequency of each received echo signal consequently differs in frequency from the instantaneous frequency, which the transmitted signal has at the time of reception, by an amount which is dependent on the transit time of the echo signal. The difference in frequency between the transmitted signal and the received signal, which may be obtained by mixing the two signals and evaluating the Fourier spectrum of the mixed signal, accordingly corresponds to the distance of the reflecting surface from the antenna, and the level of the frequency characteristic corresponds to the magnitude of the echo amplitude. This Fourier spectrum, therefore, constitutes the echo function in this case.

The antenna serves for feeding into the process, the best possible impedance match being employed in order to avoid impedance discontinuities so that no interfering local reflections occur, which would swamp the wanted signal. Nevertheless in practice, for instance with a horn feeder, internal reflection will occur at the point of feed into the antenna and at the horn.

A particular problem in connection with level measurement using microwaves is that a deposit of material may build up on the antenna. This danger is more particularly to be found in the case of dusty or powdery material, especially if the antenna is moist, and furthermore in the case of sticky and viscous materials. While microwave antennas tolerate a certain degree of fouling, they cease to be operational if the deposit layer is excessive. In this case the radar signal will be completely absorbed at the antenna so that no useful echo may be detected. Using conventional methods it is accordingly no longer possible to distinguish whether there is no reflecting surface present in the beam path, whether there is heavy attenuation in the beam path clear of the antenna (for instance in the case of foam on the material), or whether the antenna has been blocked by the formation of a deposit.

Figure 2:
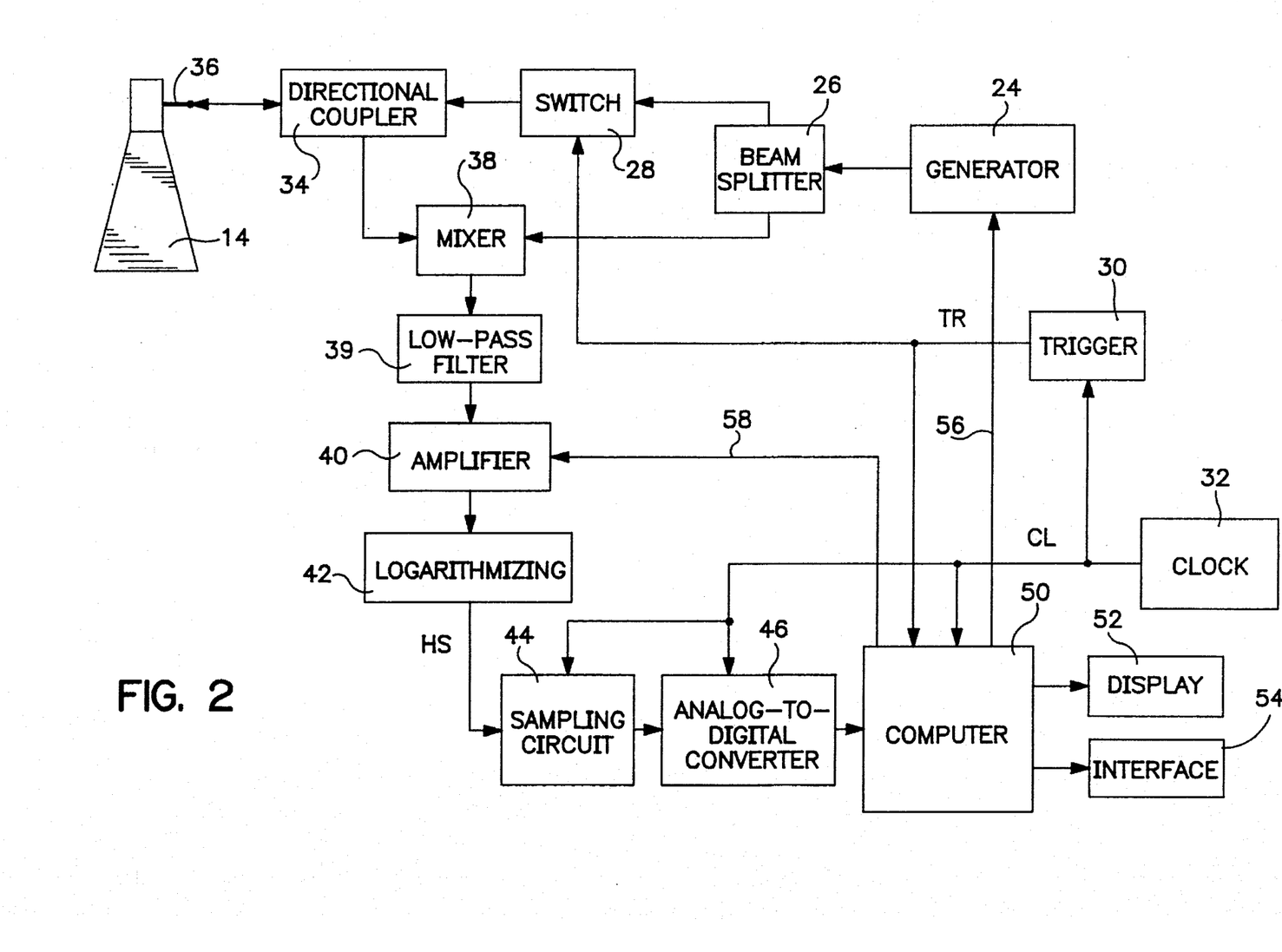
FIG. 2 is a block circuit diagram of a level measuring device having means for detecting the formation of a deposit on the antenna and further trouble conditions.

FIG. 2 shows a block circuit diagram of the transmission circuit and of the reception and evaluation circuit of a level measuring device operating in accordance with the pulsed radar method, in which case additional measures have been adopted in order to recognize the formation of deposits on the antenna and possible other trouble conditions.

FIG. 2 again diagrammatically shows the antenna 14 in the form of a horn radiator. A generator 24 produces a continuous ultrahigh frequency oscillation having the frequency of the microwaves to be transmitted, which is supplied via a beam splitter 26 to a switch 28. This switch 28 is periodically operated by a trigger signal TR produced by a trigger 30 on the basis of a clock signal CL furnished by a clock 32. The output of the switch 28 is connected via a directional coupler 34, which assumes the role of the transmit-receive switch in FIG. 1, to the feed pin 36 of the antenna 14. Each time the switch 28 is closed a short time a short pulse is transmitted from the antenna 14. The echo signals received as a consequence of the transmission of pulses by the antenna are supplied via the directional coupler 34 to one input of a mixer 38, which at its second inputs gets a signal derived from the output signal of the generator 24 by the beam splitter 26. The envelope signal obtained by the mixing of the two signals in the mixer 38 is filtered in a low pass filter 39 and then amplified in an amplifier 40, the output of which is connected to a logarithmizing circuit 42 which compensates the attenuation of the echo signals as a function of the transit time. The logarithmized and amplified envelope signal HS furnished at the output of the logarithmizing circuit 42 and representing the echo function in analog form is supplied to a sampling circuit 44 which obtains therefrom, in the course of the reception phase following the transmission pulse, under control by the clock signal CL a series of sampled values which preferably are equally spaced in time. Each sampled value has the amplitude of the envelope signal HS at the instant of sampling. An analog-to-digital converter 46 following the sampling circuit 44 converts each sampled value into a digital code group representing a number, the numerical value of which corresponds to the amplitude of the sampled value. The sequence of digital code groups represents the digitized echo function, the amplitude resolution of which is determined by the number of positions of the digital code groups and the time resolution of which is determined by the time spacing of the sampled values obtained by the sampling circuit 44.

In performing a level measurement the digital code groups furnished in sequence by the analog-to-digital converter 46 in the course of a reception phase are entered into a computer 50 and stored in a RAM of the computer. These stored code groups represent the actual echo function of the container 10 in the course of a measurement cycle. The computer 50 obtains from the stored actual echo function the useful echo reflected by the surface of the material in the container, determines the transit time of the useful echo and computes from this transit time the level of the material in the container. The result of the measurement may be displayed by means of a display 52 or output via an interface 54 to a process control system and the like. If desired, several echo functions in sequence may be stored in the RAM of the computer 50 so that in addition to the actual echo function one or more previous echo functions are available for a common evaluation, thus making it possible in particular to take into account the change in time of the echo function, as caused for example by a change in the level.

The function of the arrangement shown in FIG. 2 as described heretofor is conventional prior art. The special feature of the method described herein is that in addition to the actual echo functions obtained for level measurement and analyzed in the computer 50, an undisturbed echo function, which corresponds to an undisturbed measurement, is obtained and also stored in the computer 50. In this undisturbed echo function at least the echo profile in the antenna region and in the proximity zone is saved; to reliably determine the useful echo, however, the undisturbed echo function preferably contains the complete echo profile up to the end of the measuring range. So that the undisturbed echo function corresponds to an undisturbed measurement, it is obtained under the following conditions:

antenna and feeder are in place and undamaged (neither by corrosion nor mechanically nor by any other effects);

the antenna is unsoiled;

the level is not in the immediate vicinity of the antenna or even within the antenna; ideally the container should be empty.

The undisturbed echo function is preferably obtained prior to first-time operation of the measuring arrangement. Obtaining an undisturbed echo function may be repeated when required, for instance, every time the measurement conditions change.

Obtaining the undisturbed echo function is done by means of the arrangement as shown in FIG. 2 in the same way as described heretofor for obtaining the actual echo functions in level measurement; the only difference being that the digitized echo function output by the analog-to-digital converter 44 is written into a non-volatile memory, for example, an electronically erasable programmable read-only memory (EEPROM), when it is entered in the computer 50.

Then, when level measurements are performed, each actual echo function obtained in the antenna region and the proximity zone is compared to the stored undisturbed echo function and any differences found are analyzed and evaluated to recognize formation of a deposit or other trouble. For this purpose it is of advantage to form and consider the difference function between the two echo functions in the antenna region and in the proximity zone.

In curve analysis consideration is particularly given to the following criteria:

the difference function exceeds or falls short of specific thresholds in the antenna region and the proximity zone;

the difference function exhibits extreme values within the antenna region and the proximity zone, the sequence, location and height of which are analyzed;

the surface integral of the difference function and of the absolute value thereof in the antenna region and the proximity zone;

the waveform of the (e.g. linearly) weighted difference function in the antenna region and proximity zone;

the location and height of maxima of the actual echo function in the antenna region and the proximity zone;

the height of the useful echo in relation to the distance measured.

If, in addition to the actual echo function, previous echo functions are also stored in the computer, the following criteria may also be made use of:

location and height of the maxima of the previous echo functions in the antenna region and the proximity zone;

a comparison of location and height of the useful echo in the actual echo function and in previous echo functions.

These and further characteristics obtained from the echo functions may then be logically combined to obtain discriminating indications as to the condition of the measuring system.

For a better understanding the curve analysis will now be discussed on the basis of a few examples, the echo functions of which are illustrated in the graphs shown in FIGS. 3 to 6.

Figure 3:
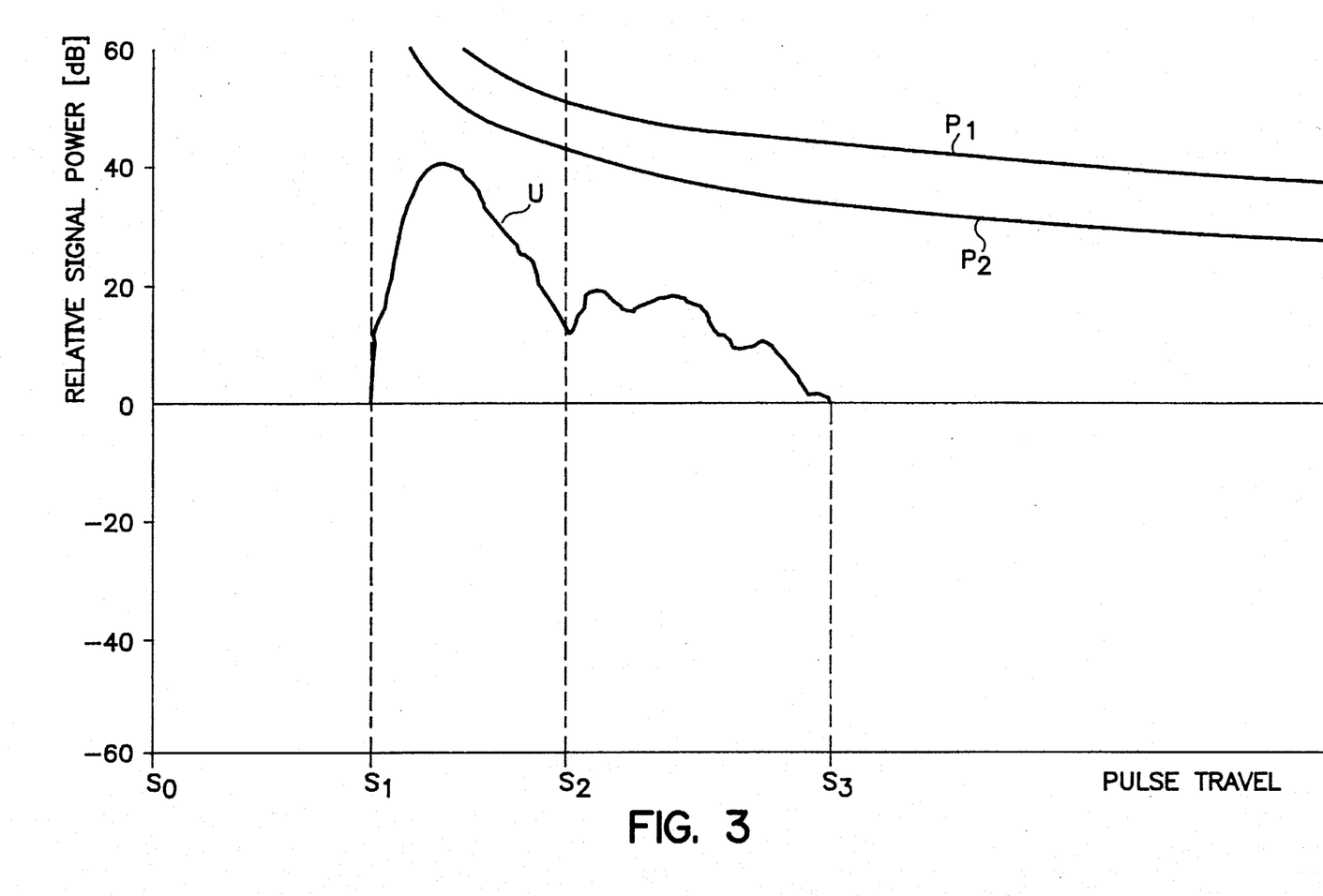
FIG. 3 shows the undisturbed echo function of an antenna having the anticipated received level and a level lowered by 10 dB.

The graph in FIG. 3 shows the undisturbed echo function U of an antenna in the antenna region and the proximity zone. This undisturbed echo function U has been obtained under the aforementioned conditions, i.e. with the container empty, the antenna undamaged and with no material deposits on the antenna. The ordinate reads the relative signal power in dB. The abscissa reads the distance covered by the microwave, point $s_0$ representing the location of the switch 28 at which the transmission pulse is generated, point $s_1$ the location of the feed pin 36 of the horn radiator 14 and point $s_2$ corresponding to the edge of the horn radiator. Accordingly, the distance $s_1-s_2$ corresponds to the antenna region. At point $s_3$ the transmission signal tail-off stemming from the internal reflections has diminished to zero; the distance $s_2-s_3$ corresponds to the proximity zone of the antenna. Instead of the distances covered by the microwaves one could, of course, just as well indicate the transit times of the microwaves which are proportional to these distances. Also indicated in FIG. 3 is the reception level $P_1$ to be expected under ideal measurement conditions according to the radar equation and a level $P_2$ which is 10 dB down in comparison thereto. Level $P_2$ defines the limit of the additional attenuation which can still be tolerated for real measurement signals. Between the two levels $P_1$ and $P_2$ lies the permissible band: all echo signals having amplitudes which lie in the permissible band are admissible for evaluation, whilst smaller echo signals which fail to attain the permissible band, are rejected. The permissible band of the reception level may, depending on the measurement medium, also be selected otherwise according to the maximum distance to be measured, the waves occuring at the measurement surface and other conditions of application.

The functions U, $P_1$ and $P_2$ shown in FIG. 3 are stored in the computer 50 and are used in the course of the measurement to evaluate each actual echo function obtained.

Figure 4:
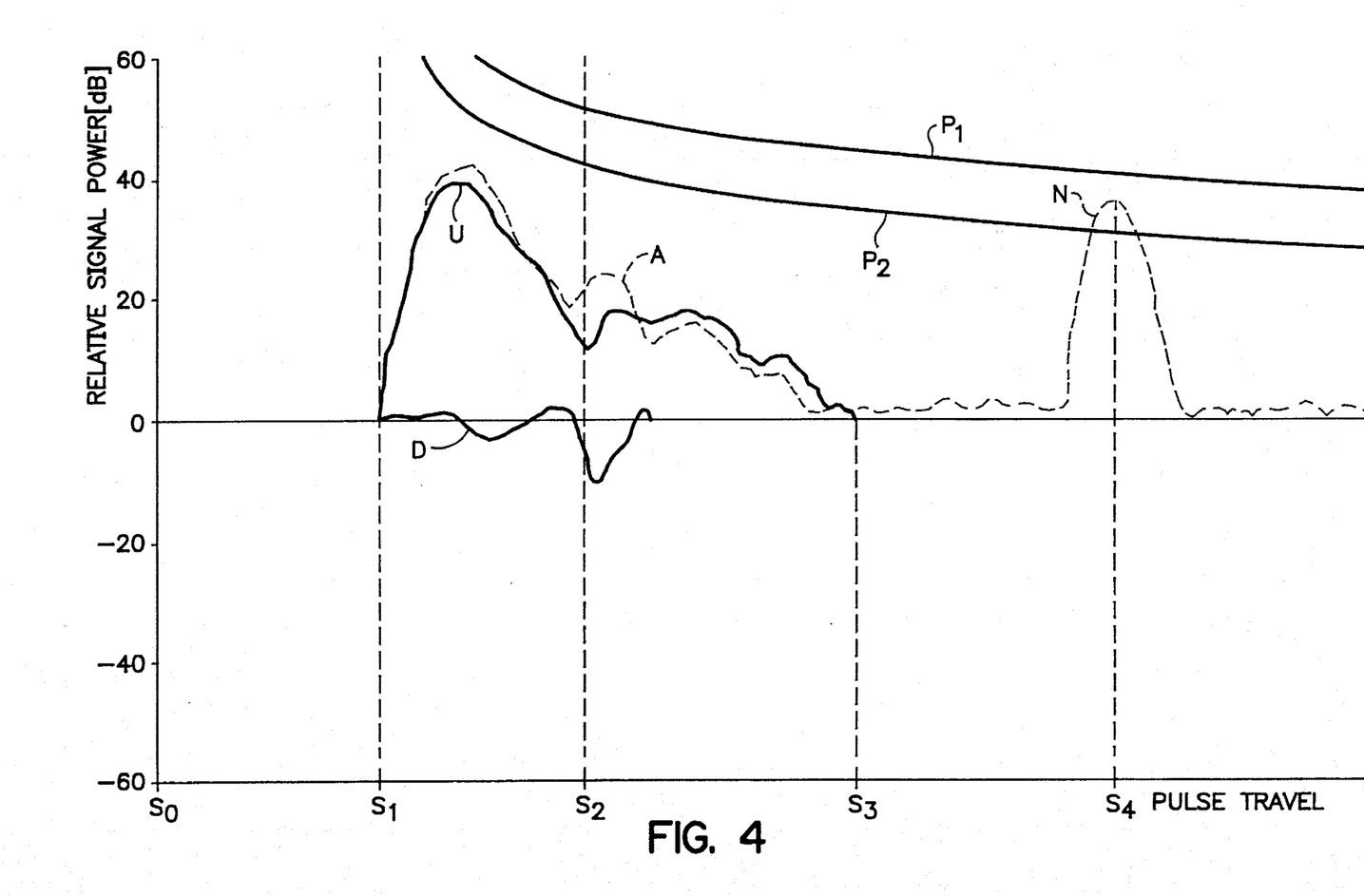
FIG. 4 shows the undisturbed echo function of the same antenna and its actual echo function for the case of a slight deposit.
Figure 5:
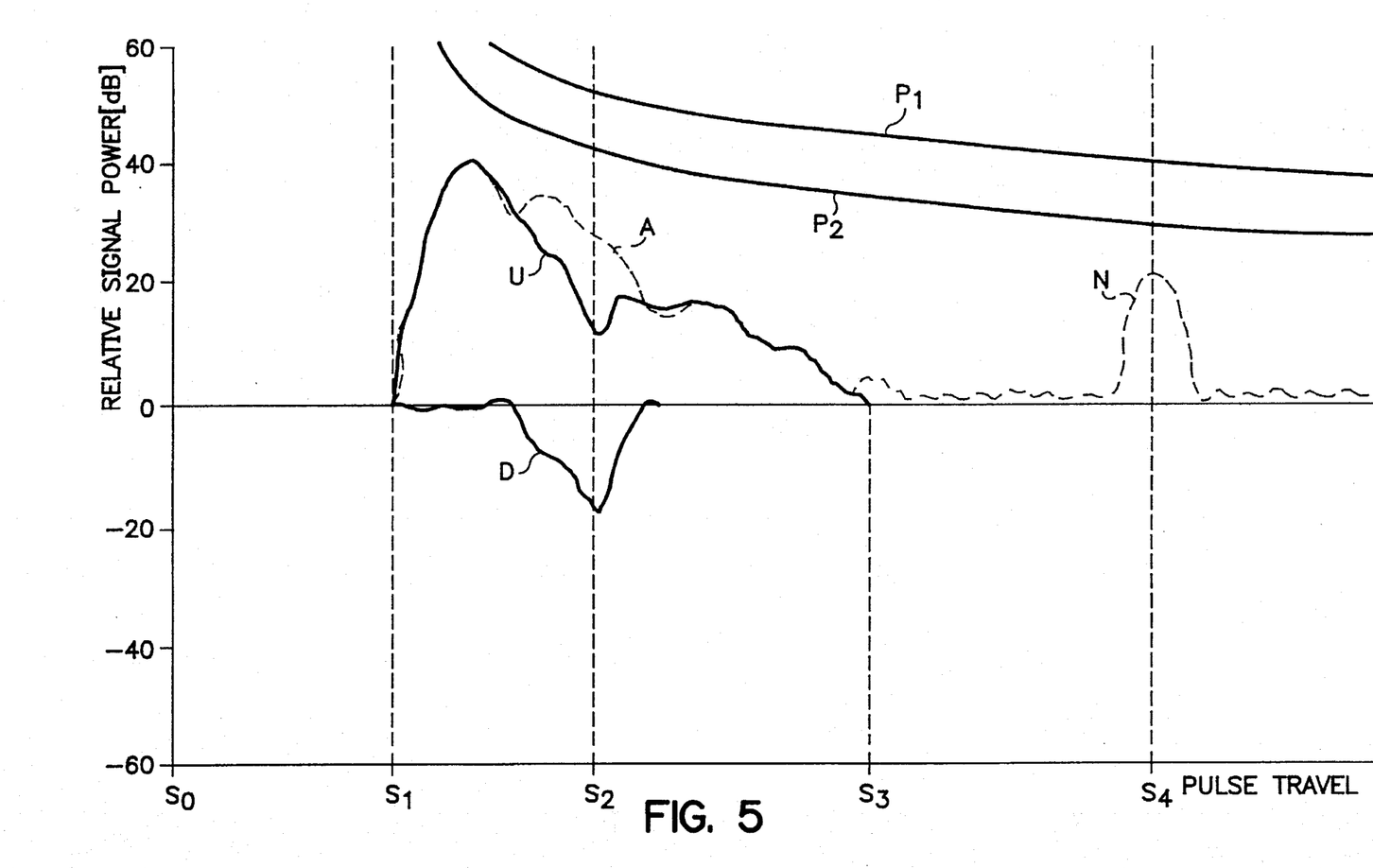
FIG. 5 shows the corresponding echo functions of the same antenna as in FIG. 4 but for the case of a heavy deposit.

The graph shown in FIG. 4 depicts in addition to the functions already shown in FIG. 3, the actual echo function A as obtained in a measurement carried out with the same antenna, when a slight deposit of material exists on the antenna. To make things clearer it is assumed that the container is almost full, so that the surface of the material therein to be measured is in the vicinity of the antenna, and only the portion of the actual echo function corresponding to this short measurement distance is shown. Furthermore, the difference function D=U–A is entered in the antenna region and the proximity zone. The difference function D permits a particularly simple way of analyzing the curves. In the antenna region and the proximity zone the actual echo function A departs only slightly from the undisturbed echo function U; accordingly the deviations of the difference function D from the zero line are relatively small. The actual echo function A contains the useful echo N, the maximum of which is located at point $s_4$; this point corresponds to the location of the useful reflecting surface, i.e. the surface to be measured of the material in the container. The distance $s_1-s_4$ is thus the measurement distance which in the illustrated example amounts to roughly 2 m. Due to the material deposit on the antenna the amplitude of the useful echo N is roughly 5 dB down as compared to the ideal useful echo to be anticipated from the radar equation (function $P_1$), however, this is still within the permissible band. This attenuation of the actual useful echo is still acceptable; however, at worst it could prove to be a disturbance to the distance measurement when very large measurement distances are involved, due to the finite dynamic range of the measuring equipment and the attenuation resulting from the distance involved.

This is why in the case of FIG. 4 no alarm is triggered and the distance as established on the basis of the useful echo N is accepted as being correct. Possibly a warning that a material deposit is beginning to form may be given when the difference function D departs from the value 0 by more than a prescribed threshold value; this threshold value may amount to 10 dB, for example. The amount of the maximum deviation or also the surface integral of the absolute value of the difference function D may be established as a measure for the magnitude of the deposit formation and indicated as such. For this purpose the amount of the difference function D may be weighted linearly or non-linearly.

FIG. 5 again shows the curves of FIG. 4, but for the case in which the material deposit on the antenna is so heavy that the amplitude of the echo from a reflecting surface at a distance of 2 m away lies approx. 20 dB below the curve $P_1$. This echo amplitude is thus no longer in the permissible band. In the antenna region and the proximity zone regions exist in which the actual echo function A and the undisturbed echo function U are more or less the same, as well as regions in which major deviations exist between these two echo functions. Here, as well as in the example shown in FIG. 4 comparing the actual echo function A to a threshold value at a specific location in the antenna region would fail to permit reliable recognition of the existence of a material deposit; even when the material deposit could be classed as being disastrous an alarm could still possibly be lacking. By contrast, comparing the difference function D to a given threshold value of e.g. 10 dB throughout the total antenna region and the proximity zone provides a reliable indication of detecting a material deposit. The computer 50 establishes the amount of maximum deviation of the difference function D from the value 0 and outputs a deposit alarm to the display 52 and/or the interface 54 when the deviation exceeds the given threshold value. The amount of the maximum deviation or also the surface integral of the absolute value of the difference function D may be stated as a measure for the amount of deposit formed.

Figure 6:
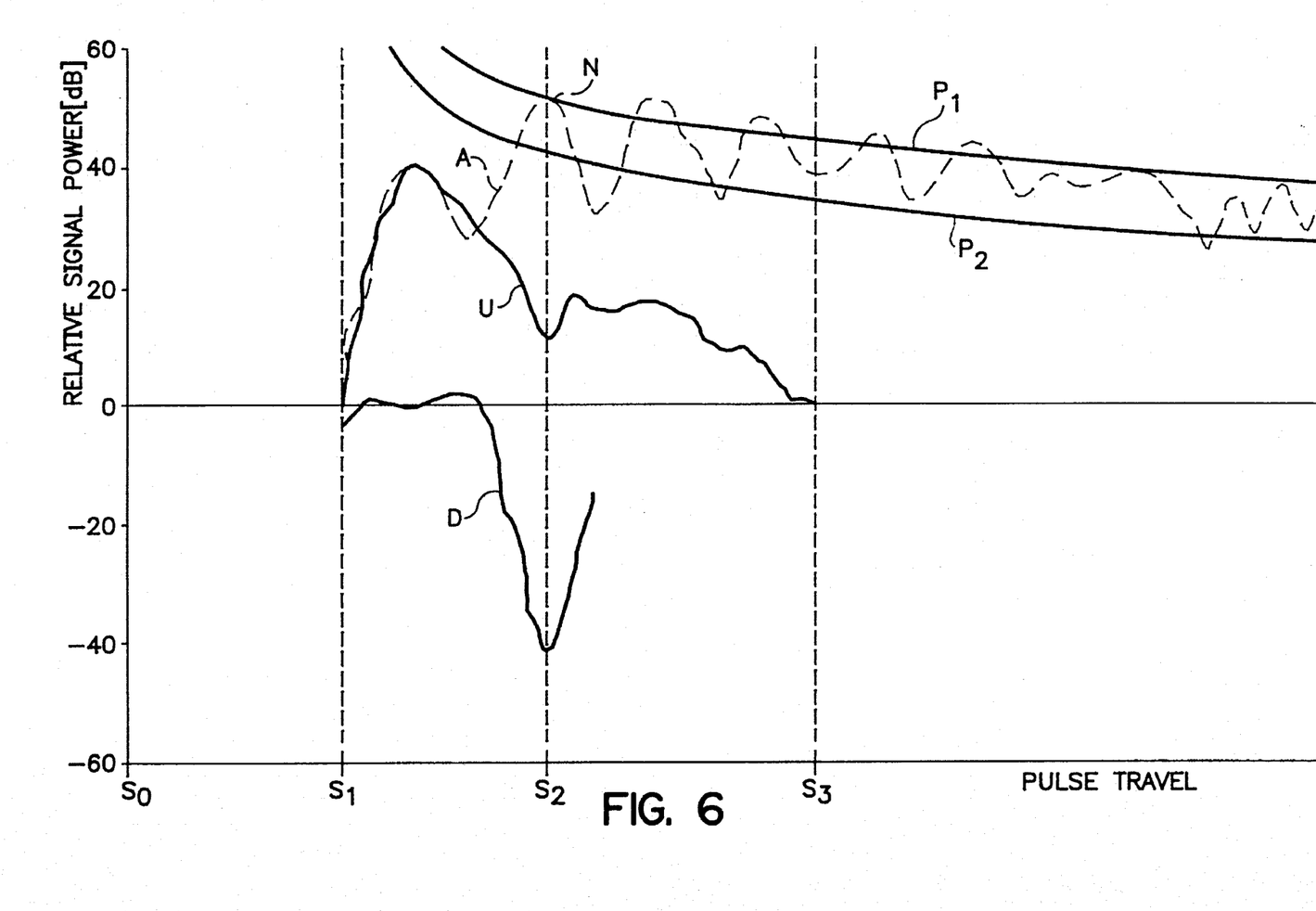
FIG. 6 shows the undisturbed echo function of the same antenna and its actual echo function for the case that the level is in the vicinity of the edge of the antenna, but with the antenna free of a deposit.
Figure 7:
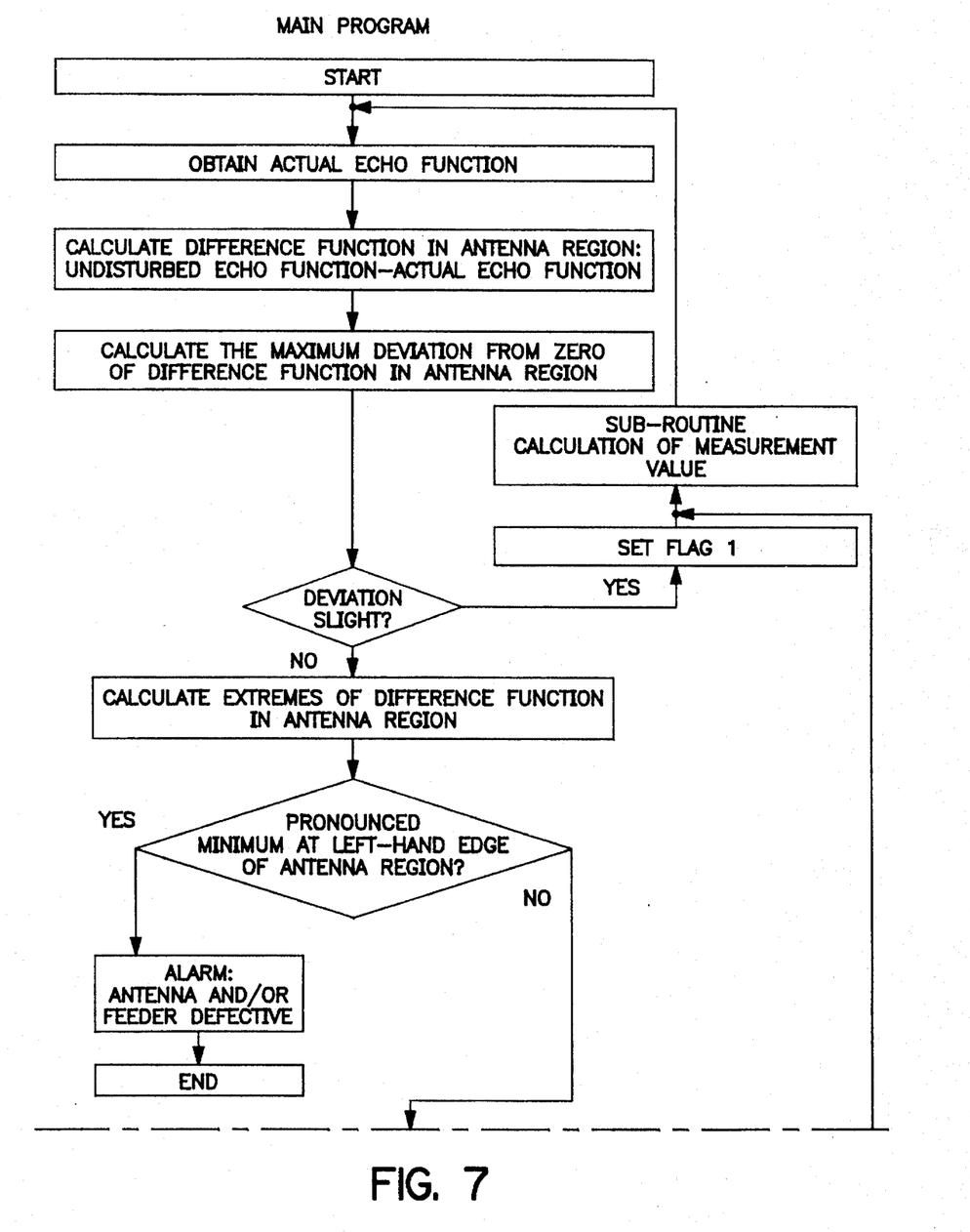
FIGS. 7 to 10 are the flow diagrams of a computer program for evaluating the echo functions.
Figure 8:
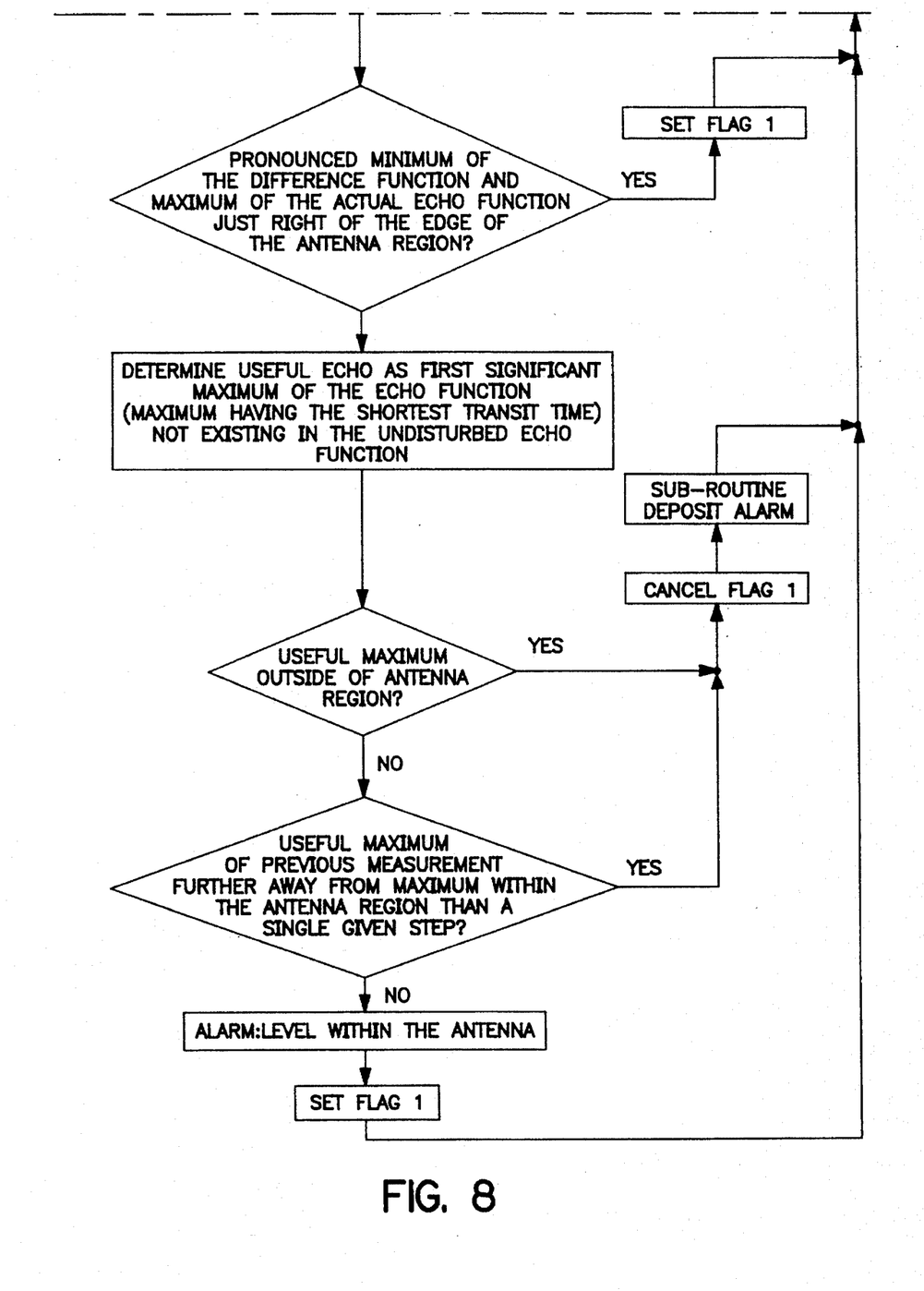

In FIG. 6 the case considered is that in which the level is in the vicinity of the antenna edge, the antenna being free of any deposit. The first echo peak in the actual echo function A represents the useful echo N reflected by the surface of the material in the container; this is followed by further echo peaks stemming from multiple reflections. In this case, the method of merely detecting the amount of the actual echo function at a location in the vicinity of the antenna edge would trigger an alarm, since no distinction can be made between a level in the vicinity of the antenna edge and formation of a deposit. The fact that the difference function D is at a minimum slightly outside of the antenna region and the actual echo function A has a maximum slightly outside of the antenna region clearly indicates, however, that what is involved here is not a deposit but the level in the vicinity of the antenna. A further explicit indication is the size of the minimum of the difference function D which is an indication of a closed reflecting surface. If this were a deposit, the internal region of the horn antenna would have to be clogged up which would influence the forward part of the difference function. On the basis of these criteria the computer 50 neglects outputting a deposit alarm in the case of FIG. 6, and it establishes the level from the transit time of the first echo peak in the actual echo function.

Due to the curves $P_1$ and $P_2$ the amplitude of the received useful echo is also taken into consideration as a salient criterium. This amplitude depends on the transmission power, distance and size of the useful reflection surface area, the reflection properties of the medium, the roughness of the reflecting surface and the geometry of the container. In level measurement, as a result of the radar equation, a more or less square relationship exists between the power reflected back to the antenna by the surface of the material in the container and the distance, as long as the walls of the container or internal structures do not disturb the beam path excessively. Due to the finite diameter of the container, more signal is received, however, from long distances away than predicted by the radar equation under conditions of free space. The precise relationship may be determined individually when implementing the measurement arrangement in a specific container. In this way, and on the basis of the reflection properties of the material in the container, a band is defined as a function of the distance involved, in which—when taking into account any fluctuations in the power due to turbulent liquid or irregular solid surfaces—the power of the useful echo scaled to the transmission power must lie. When the limits of this distance-dependent dependent band are continually violated then an alarm needs to be given.

When not only the actual echo function but also one or more previous echo functions are stored in the computer, it is furthermore of advantage in obtaining a reliable distinction between material deposit and material level in the vicinity of the antenna (or even in the antenna) to also take into account the distance of the useful echo from the previous measurements, in addition to the aforementioned criteria. This makes use of the fact that in a continuous level measurement the level and accordingly the location of the useful echo cannot change abruptly. Thus, for instance in FIG. 5 with reference to the antenna region, the peak in the actual echo function A—although strongly deformed and therefore being unlikely to stem from a reflecting surface— could in principle have materialized from reflection at the surface of a medium having a small dielectric constant standing in the antenna. This can be reliably eliminated, however, when the useful echo had always been at another location previously and failed to continually drift into this peak.

Figure 9:
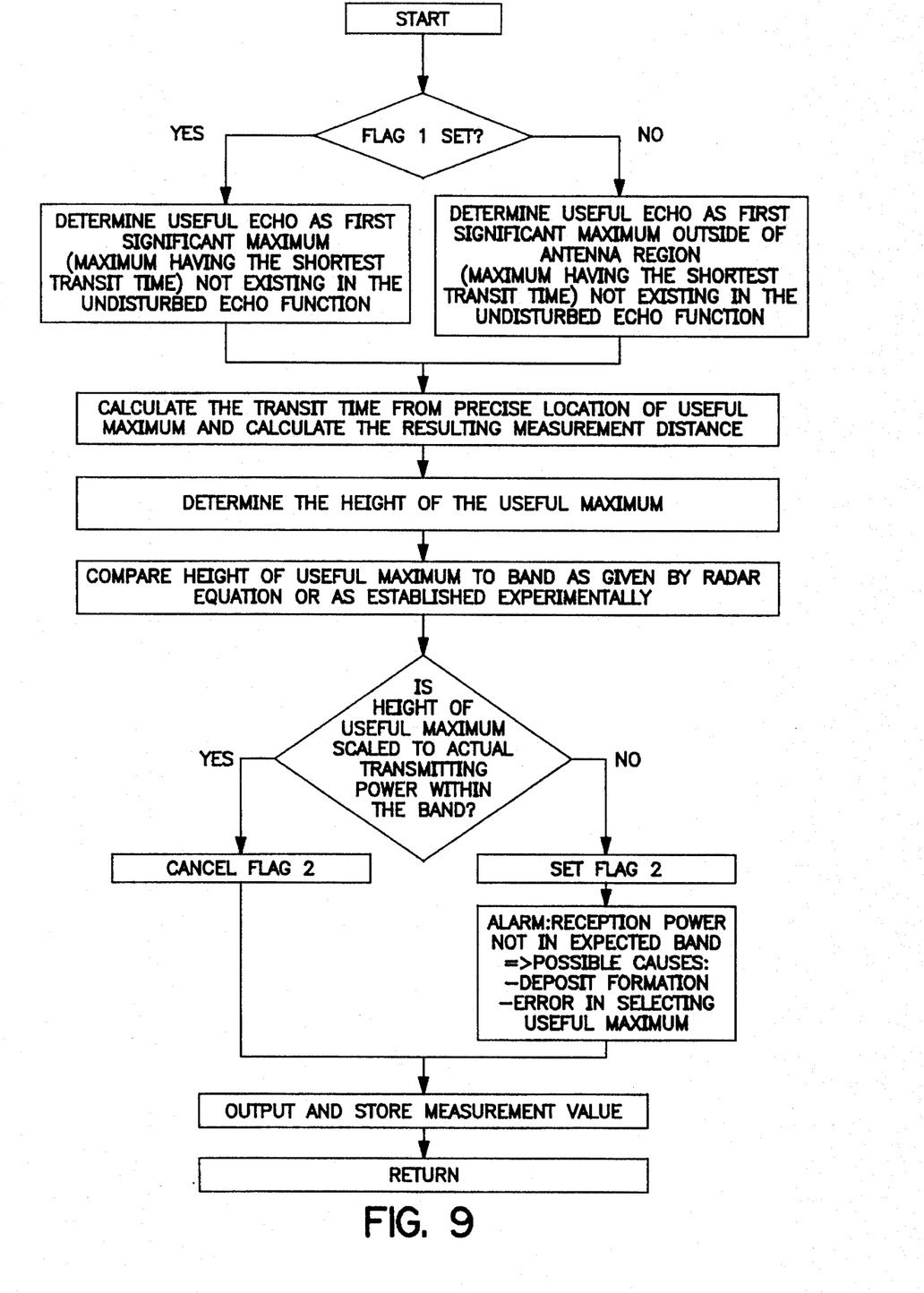
Figure 10:
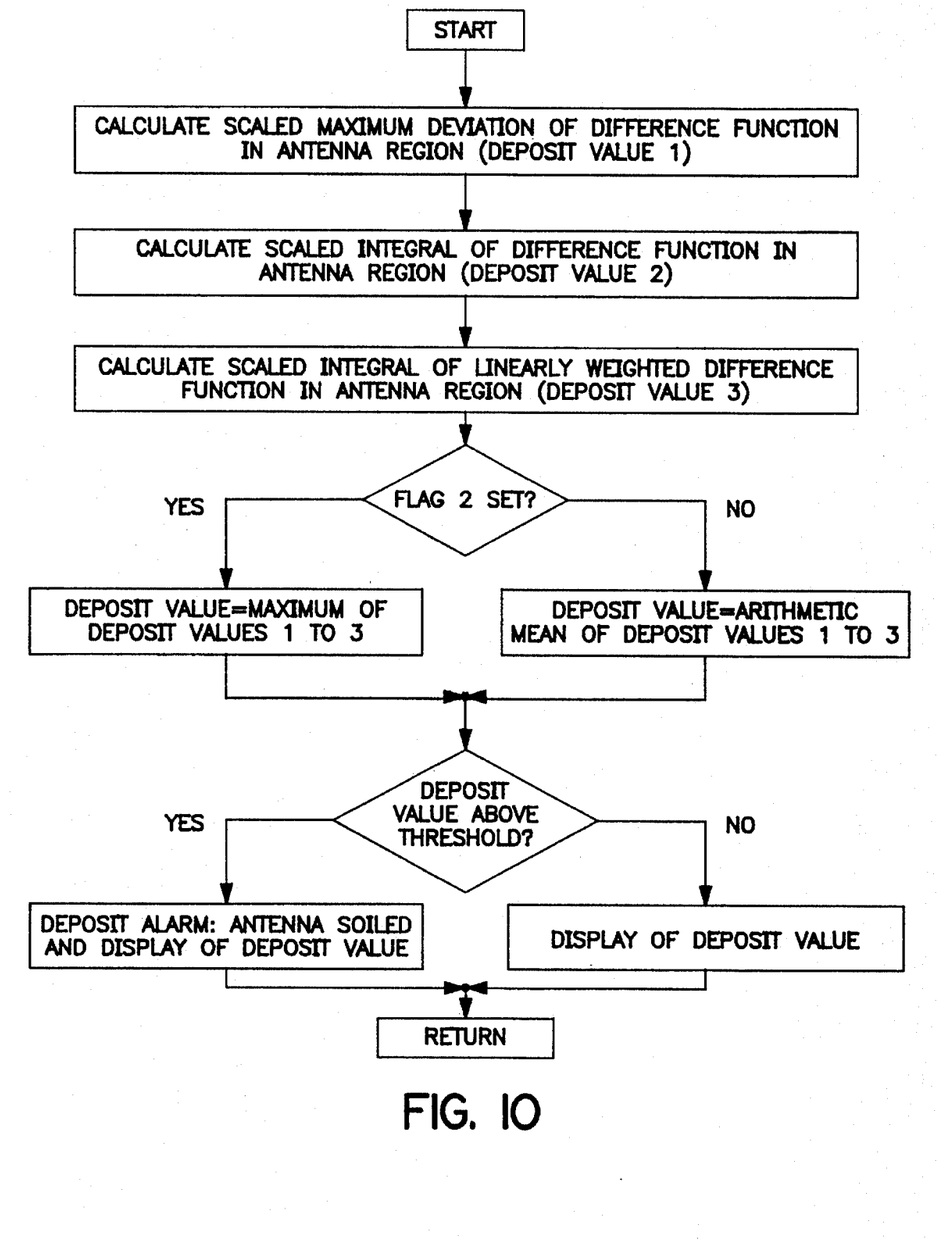

FIGS. 7 thru 10 show as an example the flow diagram of a computer program with which the computer 50 by evaluating the aforementioned criteria is able to calculate the measurement value and, if necessary, to output an alarm because of a deposit. The FIGS. 7 and 8, which are to be joined along the dot-dashed lines, represent together the main program. FIG. 9 is the flow diagram of a sub-routine for calculating the measured value, and FIG. 10 is the flow diagram of a sub-routine for the deposit alarm; these sub-routines are called by the main program where indicated. Assuming that prior to first-time start of the main program the functions shown in FIG. 3, i.e. the undisturbed echo function U and the two level functions $P_2$ and $P_2$ have been defined and stored in the computer 50, then once the main program has started, it is repeated cyclically and in every cycle a measurement value is computed and/or a deposit alarm is output. When one of the variables "flag 1" and "flag 2" is set or cancelled in a cycle it retains this status in the following cycles, until returned in the opposite status. Otherwise, the flow diagrams will be appreciated with no further explanation, due to the text blocks inserted accordingly.

We claim:

1. A radar-based method for measuring a level of material in a container, comprising the steps of:

emitting microwaves to the surface of the material by means of an antenna;

receiving the echo waves reflected from the surface of the material using the antenna;

storing an undisturbed echo function corresponding to an undisturbed measurement;

forming an actual echo function from the echo waves received by the antenna for each measurement, the actual echo function representing the echo amplitudes as a function of the distance to the surface of the material from the antenna;

comparing the actual echo function to the undisturbed echo function corresponding to the undisturbed measurement;

evaluating deviations detected by the comparison between the actual echo function to the undisturbed echo function in the antenna region and in the adjacent proximity zone to recognize at least one of formation of deposit on the antenna, damage to the antenna, and loss of the antenna.

2. The method as set forth in claim 1, wherein the step of evaluating deviations comprises forming a difference function representing the difference between the undisturbed echo function and the actual echo function and evaluating the difference function.

3. The method as set forth in claim 2, wherein the step of evaluating the difference function comprises determining whether the difference function exceeds predetermined level values at predetermined locations in at least one of the antenna region and the proximity zone.

4. The method as set forth in claim 2, wherein the step of evaluating the difference function comprises determining extreme values of the difference function and their locations in the antenna region and the proximity zone.

5. The method as set forth in claim 2, wherein the step of evaluating the difference function comprises forming the integral of the difference function in the antenna region.

6. The method as set forth in claim 2, wherein the step of evaluating the difference function comprises forming the integral of at least one of a linearly weighted difference function and a nonlinearly weighted difference function in the antenna region.

7. The method as set forth in claim 1, further comprising the step of establishing a probable useful echo and the transit time thereof from the actual echo function, determining from the transit time the distance of the material surface from the antenna, determining the height of the probable useful echo in the actual echo function and determining whether this height, dependent on the measuring distance, lies in a given band.

8. The method as set forth in claim 7, wherein the given band is determined experimentally for an undisturbed measurement.

9. The method as set forth in claim 1, further comprising the step of forming an undisturbed echo function from echo waves received by the antenna when the antenna has no deposits thereon, and when the container is empty.

10. The method as set forth in claim 1, wherein said undisturbed echo function is stored in a non-volatile memory.

* * * * *